(12) United States Patent
Gwon et al.

(10) Patent No.: US 11,181,774 B2
(45) Date of Patent: Nov. 23, 2021

(54) OPTICAL FILM AND DISPLAY DEVICE COMPRISING THE SAME

(71) Applicant: LG Display Co., Ltd., Seoul (KR)

(72) Inventors: SeungJu Gwon, Paju-si (KR); HyeokJoon Yoon, Paju-si (KR); SeMin Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/148,186

(22) Filed: Oct. 1, 2018

(65) Prior Publication Data
US 2019/0137822 A1 May 9, 2019

(30) Foreign Application Priority Data
Nov. 8, 2017 (KR) .................. 10-2017-0148183

(51) Int. Cl.
*G02F 1/13357* (2006.01)

(52) U.S. Cl.
CPC .. *G02F 1/133605* (2013.01); *G02F 1/133606* (2013.01)

(58) Field of Classification Search
CPC combination set(s) only.
See application file for complete search history.

(56) References Cited

U.S. PATENT DOCUMENTS

| 6,285,425 B1* | 9/2001 | Akins | G02F 1/133553 |
| | | | 349/113 |
| 7,042,610 B1* | 5/2006 | Berman | G02B 5/00 |
| | | | 359/226.1 |
| 9,229,239 B2 | 1/2016 | Aronson et al. | |
| 2004/0008310 A1* | 1/2004 | Leidig | G02F 1/133634 |
| | | | 349/124 |
| 2009/0165943 A1 | 7/2009 | Kim | |
| 2011/0018009 A1 | 1/2011 | Krumaccher et al. | |

(Continued)

FOREIGN PATENT DOCUMENTS

| CN | 101395524 A | 3/2009 |
| CN | 105116476 A | 12/2015 |
| JP | 2013-088580 A | 5/2013 |

(Continued)

OTHER PUBLICATIONS

Yihong et al., English language machine translation of CN 105116476 A, Published Feb. 12, 2015, Downloaded May 12, 2020 from WIPO, https://patentscope.wipo.int/search/en/detail.jsf;jsessionid=510A5351B161C5E6009E324B27114752.wapp1nC?docId=CN154057349&tab=PCTDESCRIPTION (Year: 2015).*

(Continued)

*Primary Examiner* — Jessica M Merlin
(74) *Attorney, Agent, or Firm* — Morgan, Lewis & Bockius LLP (57) ABSTRACT

An optical film and a display device including the same are disclosed, in which an image of the display device is prevented from being irradiated to an unwanted place and luminance is prevented from being deteriorated. The optical film includes a first base film; a second base film spaced apart from the first base film to face the first base film; an optical pattern arranged between the first base film and the second base film, having an inclined surface inclined at a certain angle; and a reflective member arranged at one side of the optical pattern.

19 Claims, 7 Drawing Sheets

(56) References Cited

U.S. PATENT DOCUMENTS

2015/0370133 A1* 12/2015 Kim .................. G02F 1/133608
362/97.1
2016/0363708 A1   12/2016 You et al.

FOREIGN PATENT DOCUMENTS

| | | |
|---|---|---|
| JP | 2016151711 A | 8/2016 |
| KR | 10-2009-0001236 A | 1/2009 |
| KR | 10-2012-0026570 A | 3/2012 |
| KR | 20130005409 A | 1/2013 |
| KR | 10-2013-0126546 A | 11/2013 |
| KR | 10-2016-0147121 A | 12/2016 |
| KR | 10-2017-0005520 A | 1/2017 |

OTHER PUBLICATIONS

Notification of First Office Action dated Mar. 27, 2020, issued in corresponding Chinese Patent Application No. 201811318213.3.

* cited by examiner

OPTICAL FILM AND DISPLAY DEVICE COMPRISING THE SAME

The present application claims the benefit of Korean Patent Application No. 10-2017-0148183, filed on Nov. 8, 2017, which is hereby incorporated by reference.

BACKGROUND

Technical Field

The present disclosure relates to an optical film and a display device comprising the same.

Description of the Related Art

With the advancement of the information age, a demand for a display device for displaying an image has been increased in various forms. Therefore, various display devices such as liquid crystal display (LCD) devices, plasma display panel (PDP) devices, and organic light emitting display (OLED) devices have been used.

The display devices have been used for various purposes such as portable image devices in accordance with the development of a high speed communication network. For example, a display device is combined with a global positioning system and then used as a navigator to guide a position and road to a user. In this way, the display device may serve as a personal display device to allow a user to view an image program and serve to guide a road to a destination by displaying the road during driving when it is built in a car.

Figure 1:
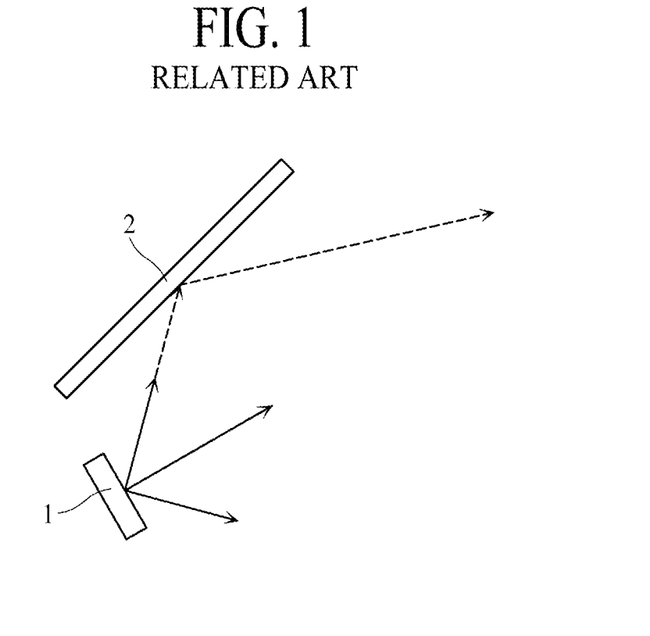
FIG. 1 is a view illustrating an optical path of a general display device.

However, as shown in FIG. 1, if the display device 1 is built in a driver's seat of a car to display an image, a problem occurs in that the image displayed on the display device 1 is reflected from a window 2 of the car to disturb the driver's vision, thereby disturbing safety driving.

To solve the problem, an optical film for absorbing light so as not to emit an image of the display device to an unwanted place is used. However, the optical film of the related art absorbs much light. Therefore, the display device of the related art has a problem in that luminance is deteriorated by the optical film.

SUMMARY

Accordingly, embodiments of the present disclosure are directed to an optical film and a display device comprising the same that substantially obviates one or more of the problems due to limitations and disadvantages of the related art.

The present disclosure has been made in view of the above problems, and an object of the present disclosure is to provide an optical film and a display device comprising the same.

Another object of the present disclosure is to provide an optical film and a display device comprising the same in which an image of the display device is prevented from being irradiated to an unwanted place and luminance is prevented from being deteriorated.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, an optical film and a display device comprising the same are provided. The optical film comprises a first base film; a second base film spaced apart from the first base film to face the first base film; an optical pattern arranged between the first base film and the second base film, having an inclined surface inclined at a certain angle; and a reflective member arranged at one side of the optical pattern.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated and constitute a part of this application, illustrate embodiments of the disclosure and together with the description serve to explain various principles. In the drawings.

DETAILED DESCRIPTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, an optical film and a display device comprising the same according to example embodiments of the present disclosure will be described with reference to the accompanying drawings. Wherever possible, the same reference numbers will be used throughout the drawings to refer to the same or like parts. Also, in the following description of the present disclosure, if detailed description of elements or functions known in respect of the present disclosure is determined to make the subject matter of the present disclosure unnecessarily obscure, the detailed description will be omitted.

Hereinafter, example embodiments of the present disclosure will be described in detail with reference to the accompanying drawings.

Figure 2:
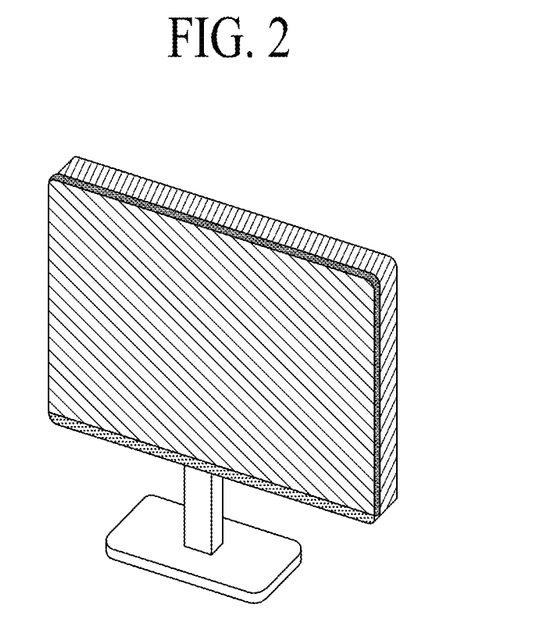
FIG. 2 is a perspective view illustrating a display device according to one embodiment of the present disclosure.
Figure 3:
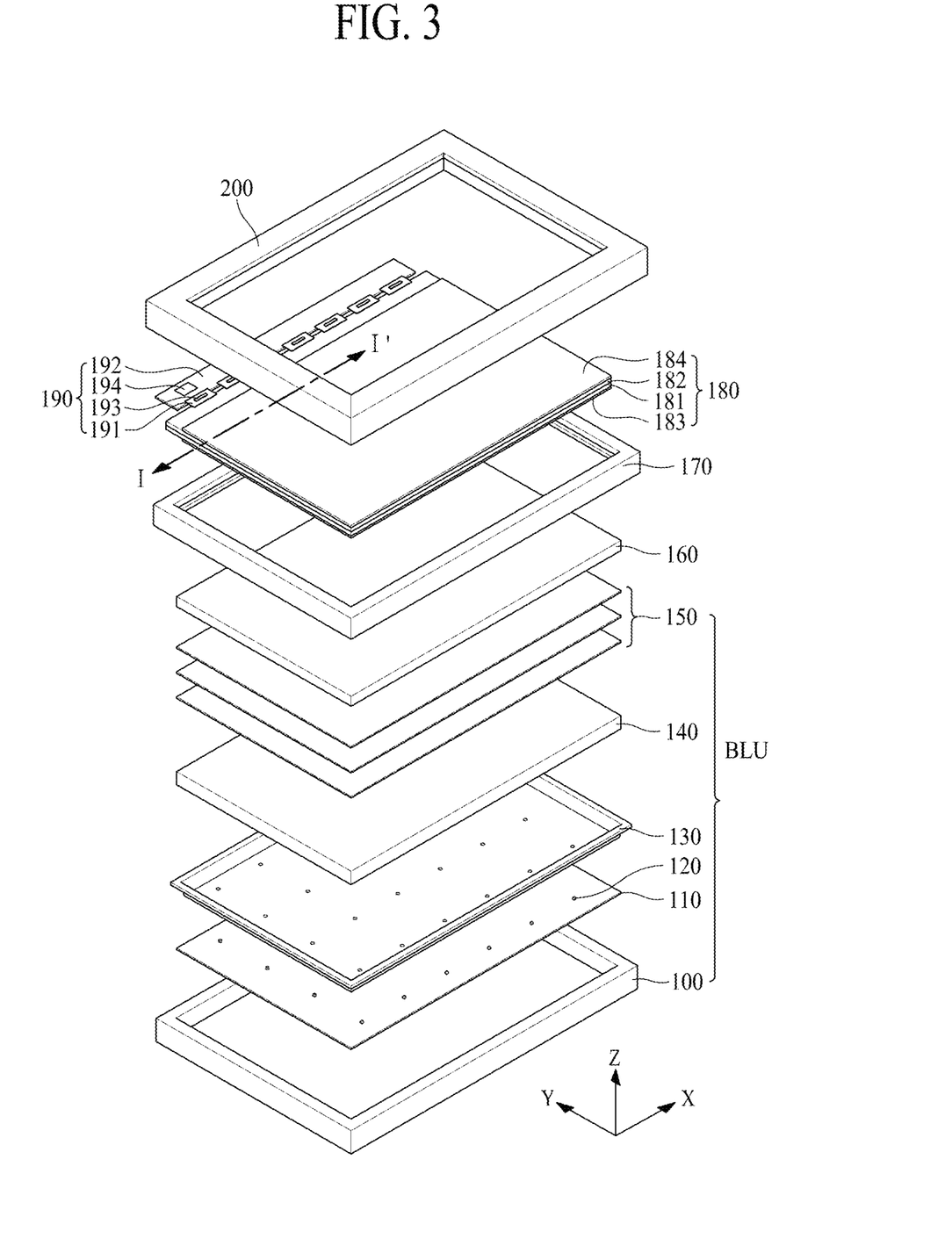
FIG. 3 is an exploded perspective view illustrating a detailed display device according to one embodiment of the present disclosure.
Figure 4:
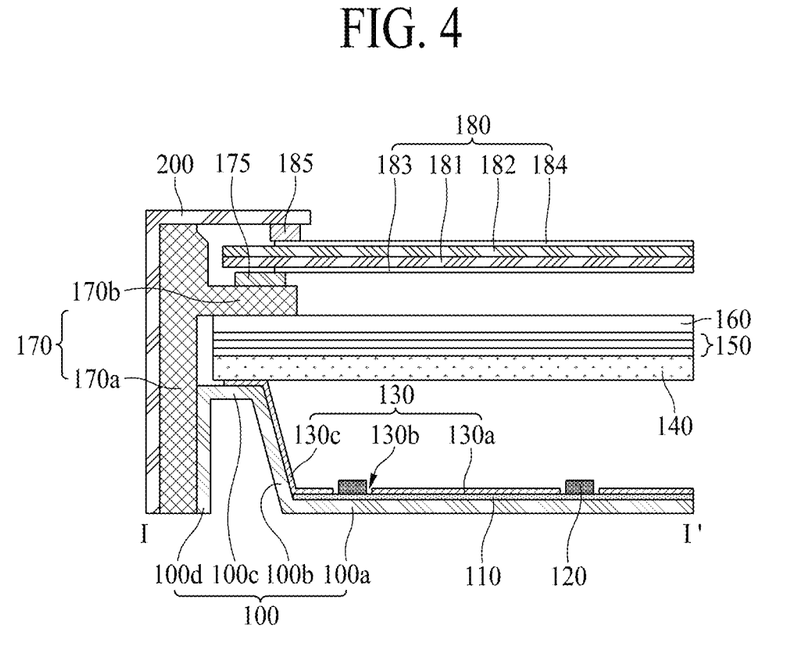
FIG. 4 is a cross-sectional view taken along line I-I' of FIG. 3, illustrating a display device according to one embodiment of the present disclosure.

FIG. 2 is a perspective view illustrating a display device according to one embodiment of the present disclosure, and FIG. 3 is an exploded perspective view illustrating a detailed display device according to one embodiment of the present disclosure. FIG. 4 is a cross-sectional view taken along line I-I' of FIG. 3, illustrating a display device according to one embodiment of the present disclosure.

Although the display device according to one embodiment of the present disclosure will be described to be realized as a liquid crystal display device, the display device may be realized as an organic light emitting display or an electrophoresis display device.

Referring to FIGS. 2 to 4, the display device according to the embodiment of the present disclosure comprises a lower case 100, a backlight unit BLU, an optical film 160, a panel guide 170, a liquid crystal panel 180, a panel driver 190, and an upper case 200.

The lower case 100 receives the backlight unit BLU and supports the panel guide 170. The lower case 100 may be made of a metal material to radiate heat generated from light sources. The lower case 100 according to one example may include a case bottom 100a, a first case side 100b, a case support surface 100c, and a second case side 100d.

The case bottom 100a is arranged to face the liquid crystal panel 180. The case bottom 100a receives the backlight unit BLU at an upper portion, and the backlight unit BLU is arranged to face the liquid crystal panel 180 and thus irradiate light to the liquid crystal panel 180.

The first case side 100b is extended from the case bottom 100a to constitute a side of the lower case 100.

The case support surface 100c is extended from the first case side 100b and arranged to face the liquid crystal panel 180. The case support surface 100c may support a diffuser 140, an optical sheet portion 150 and the optical film 160.

The second case side 100d is an outer side of the lower case 100, and is extended from the case support surface 100c to face the panel guide 170. The second case side 110d may be sealed by the panel guide 170, and may be coupled to the panel guide 170 and fixed thereto.

The backlight unit BLU is arranged below the liquid crystal panel 180 to irradiate light to a lower surface of the liquid crystal panel 180. The backlight unit BLU is received in the lower case 100.

Although the display device according to one embodiment of the present disclosure will be described to be realized a direct type liquid crystal display device in which light sources are arranged below the diffuser, the display device may be realized as an edge type liquid crystal display device in which light sources are arranged at one side of a light guide plate.

The backlight unit BLU according to one example may include a printed circuit board 110, light sources 120, a reflector 130, a diffuser 140, and an optical sheet portion 150.

The printed circuit board 110 for light sources is arranged on the lower case 100. The printed circuit board 110 packages a plurality of light sources 120 therein. The printed circuit board 110 includes a driving power line for receiving an external driving power, and supplies a driving power supplied from the outside through the driving power line to each of the plurality of light sources 120, whereby the lighting sources 120 emit light.

Each of the plurality of light sources 120 is arranged to be spaced apart from another light source on the printed circuit board 110 for light sources and then connected to a light source driving signal line. The plurality of light sources 120 irradiate light to a lower surface of the diffuser 140. The plurality of light sources 120 may emit light simultaneously or individually in accordance with a light source driving signal supplied from the light source driving signal line.

A lateral chip structure, a flip chip structure, a vertical chip structure, and a chip scale package structure may be applied to the light sources 120 according to one example. Each of the plurality of light sources 120 according to one example may be made of a chip scale package. In this case, each of the plurality of light sources 120 is directly packaged onto the printed circuit board 110, whereby a packaging process of the light sources 120 is not required in the present disclosure. As the light sources 120 are made of a chip scale package, the backlight unit BLU and the display device according to one example may have a thin thickness and an improved esthetic effect. The light sources 120 according to one example emit light a first color light in accordance with the light source driving signal. For example, the light sources 120 may be a white light emitting diode chip for emitting white light.

The reflector 130 is arranged on the printed circuit board 110. The reflector 130 may be made of a reflective material, or a reflective material such as Al is provided on a substrate to reflect light emitted from the light sources 120 toward the diffuser 140. The reflector 130 according to one example includes a member lower surface 130a and a member side 130c.

The member lower surface 130a is arranged on the printed circuit board 110. The member lower surface 130a reflects light, which is headed from the light sources 120 to a downward direction, toward the diffuser 140. The member lower surface 130a of the reflector 130 is provided with a plurality of light source insertion holes 130b. The light sources 120 packaged in the printed circuit board 110 through the plurality of light source insertion holes 130b may be arranged on the reflector 130.

The member side 130c may be extended from the member lower surface 130a and arranged to be inclined obliquely. The member side 130c reflects light, which is headed from the light sources 120 to a side direction, toward the diffuser 140. The member side 130c may be arranged to be extended to the case support surface 100c of the lower case 100.

The diffuser 140 is supported by the lower case 100, and is arranged to cover a front surface of the lower case 100. The diffuser 140 is formed in a flat panel type having a certain thickness, and serves to diffuse light emitted from each of the plurality of light sources 120 and advance the light to the liquid crystal panel 180.

The optical sheet portion 150 is arranged on the diffuser 140. The optical sheet portion 150 serves to advance light to the liquid crystal panel 180 by condensing and diffusing light to increase luminance of the liquid crystal panel 180. Although the optical sheet portion 150 may include a lower diffusion sheet, a prism sheet, and an upper diffusion sheet, without limitation to this case, the optical sheet portion 150 may include a deposition combination of two or more selected from a diffusion sheet, a prism sheet, a dual brightness enhancement film, and a lenticular sheet.

The prism sheet may include a plurality of prism patterns formed in parallel to have a triangular cross-section, wherein a maintain portion and a valley portion of the prism pattern may be rounded at a certain curvature.

The lenticular lens sheet may include a plurality of lenticular lens patterns formed in parallel to have a semi-circle or semi-elliptical shaped cross-section having a certain curvature.

The micro lens sheet may include a plurality of micro lens patterns formed at a certain height to have a semicircle or semi-elliptical shape.

Meanwhile, the optical sheet portion 150 may further include a protective sheet for protecting the optical sheet.

The optical film 160 is arranged on the optical sheet portion 150. The optical film 160 according to one example of the present disclosure includes an optical pattern having an inclined surface inclined at a certain angle and a reflective member arranged at one side of the optical pattern. That is, the optical film 160 according to one example of the present disclosure includes a reflective member inclined at a certain angle, and the reflective member may prevent an image of the display device from being irradiated to an unwanted place by controlling an emission angle of light.

Since the optical film of the related art absorbs light incident at a certain angle so as not to be emitted, a problem occurs in that luminance of the display device is deteriorated as light incident from the light sources is partially absorbed in the display device. However, since the optical film 160 according to one embodiment of the present disclosure includes a reflective member, light is reflected without being absorbed, whereby luminance may be prevented from being deteriorated. A detailed description of the optical film 160 according to one embodiment of the present disclosure will be made with reference to FIGS. 5 to 11.

The panel guide 170 supports a rear edge of the liquid crystal panel 180 and surrounds the liquid crystal panel 180 and the backlight unit BLU. The panel guide 170 may be coupled to the liquid crystal panel 180 through a first panel coupling member 175. At this time, the first panel coupling member 175 may be coupled with a lower substrate 181 of the liquid crystal panel 180 considering a coupling force and thickness of the panel guide 170 and the liquid crystal panel 180. However, the first panel coupling member 175 may be coupled to a lower polarizing member 183 of the liquid crystal panel 180 without limitation to the lower substrate 181. The first panel coupling member 175 according to one example may be a double sided tape, a thermal hardening adhesive, a photo-hardening adhesive, or a foam tape. For example, the first panel coupling member 175 may be a double sided tape or foam tape, which has a certain elastic force to absorb impact. Additionally, the first panel coupling member 175 may include a hollow portion. In this case, the hollow portion prevents delamination of the first panel coupling member 175 and the liquid crystal panel 180 during movement of the liquid crystal panel 180 while buffering a pressure applied to the liquid crystal panel 180.

The panel guide 170 according to one example may include a guide sidewall 170a and a panel coupling portion 170b.

The guide sidewall 170a may be arranged in the form of frame surrounding the side of the display device and the backlight unit BLU. The guide sidewall 170a may be provided with a coupling hook or a coupling groove and thus coupled with the lower case 100.

The panel coupling portion 170b is protruded from the guide sidewall 170a to face the edge of the liquid crystal panel 180. The panel coupling portion 170b is coupled to a rear edge portion of the liquid crystal panel 180 through the first panel coupling member 175. The panel coupling portion 170b is coupled to a rear edge portion of the lower substrate 181 by the first panel coupling member 175, and may be coupled to an edge portion of the lower polarizing member 183 attached to a rear surface of the lower substrate 181.

The liquid crystal panel 180 is arranged on the backlight unit BLU. The liquid crystal panel 180 displays a predetermined color image in accordance with light transmittance of a liquid crystal layer (not shown) by driving the liquid crystal layer in accordance with an electric field formed per pixel by data and common voltages applied to each pixel. The liquid crystal panel 180 may include lower and upper substrates 181 and 182 bonded to each other, facing each other by interposing the liquid crystal layer therebetween, a lower polarizing member 183 attached to a rear surface of the lower substrate 181, and an upper polarizing member 184 attached to a front surface of the upper substrate 182.

Although not shown in the lower substrate 181, pixels are formed per crossing area between gate and data lines. The pixel includes a thin film transistor, a common electrode and a pixel electrode.

The thin film transistor serves as a switching transistor that transfers an electric signal to each pixel and controls the signal. A common voltage for driving liquid crystals is applied to the common electrode. The pixel electrode is arranged on a passivation film covering the common electrode and connected with the thin film transistor.

The lower substrate 181 controls light transmittance of the liquid crystal layer by forming an electric field corresponding to a differential voltage between the data voltage and the common voltage which are applied to each pixel. A pad portion, which includes a signal applying pad connected to a plurality of data lines, is arranged at the edge of the lower substrate 181.

The upper substrate 182 includes a black matrix BM and a color filter. R (Red), G (Green) and B (Blue) patterns are formed in the color filter. The black matrix is respectively arranged among the R, G and B patterns of the color filter. A column spacer CS for maintaining a cell gap between the upper substrate 182 and the lower substrate 181 may be arranged in the upper substrate 182.

The upper substrate 182 is formed to have a size smaller than that of the lower substrate 181, opens the pad portion of the lower substrate 181 by interposing the liquid crystal layer (not shown) between the lower substrate and the upper substrate, and is bonded to the lower substrate 181.

Details of the lower substrate 181 and the upper substrate 182 may be formed in various shapes in accordance with a driving mode of the liquid crystal layer, for example, a TN (Twisted Nematic) mode, a VA (Vertical Alignment) mode, an IPS (In plane switching) mode, and an FFS (Fringe field switching) mode.

The lower polarizing member 183 is attached to the lower surface of the lower substrate 181, and polarizes light entering the lower substrate 181.

The upper polarizing member 184 is attached to the front surface of the upper substrate 182, and polarizes light emitted to the outside by transmitting the upper substrate 182.

The lower polarizing member 183 and the upper polarizing member 184 have their respective polarizing functions different from each other through elongation processes in contrary directions, and have contractile forces contrary to each other based on elongation. As the lower polarizing member 183 and the upper polarizing member 184 are respectively attached to the lower substrate 181 and the upper substrate 182, contractile forces of the lower polarizing member 183 and the upper polarizing member 184 are mutually counterbalanced, whereby the liquid crystal panel 180 forms a plane state without being bent upwardly or downwardly.

The panel driver 190 is connected to the pad portion provided in the lower substrate 181 to drive each pixel of the liquid crystal panel 180, whereby a predetermined color image is displayed on the liquid crystal panel 180. The panel driver 190 according to one example includes a plurality of circuit films 191 connected to the pad portion of the liquid crystal panel 180, a data driving integrated circuit 193 packaged in each of the plurality of circuit films 191, a display printed circuit board 192 coupled to each of the plurality of circuit films 191, and a timing controller 194 packaged in the display printed circuit board 192.

Each of the circuit films 191 is attached between the pad portion of the lower substrate 181 and the display printed circuit board 192 by a film attachment process, and may be made of a tape carrier package (TCP) or a chip on flexible board or chip on film (COF). Each of the circuit films 191 may be bent along one side of the liquid crystal panel 180, that is, a lower side, and may be arranged on a rear surface of the panel guide 170.

The data driving integrated circuit 193 is packaged in each of the plurality of circuit films 191 and thus connected to the pad portion through the circuit films 191. The data driving integrated circuit 193 receives a data control signal and per-pixel data supplied from the timing controller 194, converts the per-pixel data to an analog type data signal in accordance with the data control signal, and supplies the converted data signal to a corresponding data line through the pad portion.

The display printed circuit board 192 is connected with the plurality of circuit films 191. The display printed circuit board 192 serves to supply a signal required to display an image on each pixel of the liquid crystal panel 180 to the data driving integrated circuit 193 and a gate driving circuit. To this end, various signal lines, various power circuits (not shown), and a memory device (not shown) are packaged in the display printed circuit board 192.

The timing controller 194 is packaged in the display printed circuit board 192, generates per-pixel data by aligning digital image data, which are input from a driving system in response to a timing synchronization signal supplied from an external driving system (not shown), to be suitable for a pixel arrangement structure of the liquid crystal panel 180, and provides the generated per-pixel data to the data driving integrated circuit 193. Also, the timing controller 194 controls a driving timing of each of the data driving integrated circuit 193 and the gate driving circuit by generating each of a data control signal and a gate control signal on the basis of the timing synchronization signal.

Additionally, the timing controller 194 may individually control luminance per area of the liquid crystal panel 180 by controlling the backlight unit BLU through an edge type local dimming technique.

The upper case 200 may be arranged in the form of frame surrounding the backlight unit BLU and the display device. The upper case 200 may prevent a front edge portion of the liquid crystal panel 180 or the panel guide 170 from being exposed to the outside of the liquid crystal display device.

The upper case 200 is coupled to the panel guide 170 and fixes the liquid crystal panel 180 supported by the panel guide 170. The upper case 200 may be coupled to the guide sidewall 170a of the panel guide 170 in accordance with a side coupling method based on a coupling member such as a screw or a hook.

The upper case 200 may be coupled to the liquid crystal panel 180 through a second panel coupling member 185. The second panel coupling member 185 may be a double sided tape, a thermal hardening adhesive, a photo-hardening adhesive, or a foam tape. For example, the second panel coupling member 185 may be a double sided tape or foam tape, which has a certain elastic force to absorb impact. Additionally, the second panel coupling member 185 may include a hollow portion. In this case, the hollow portion prevents delamination of the second panel coupling member 185 and the liquid crystal panel 180 during movement of the liquid crystal panel 180 while buffering a pressure applied to the liquid crystal panel 180.

As described above, the display device according to one embodiment of the present disclosure includes the optical film 160 having a reflective member at one side of the optical pattern, thereby preventing luminance from being deteriorated while preventing an image from being irradiated to an unwanted place.

Figure 5:
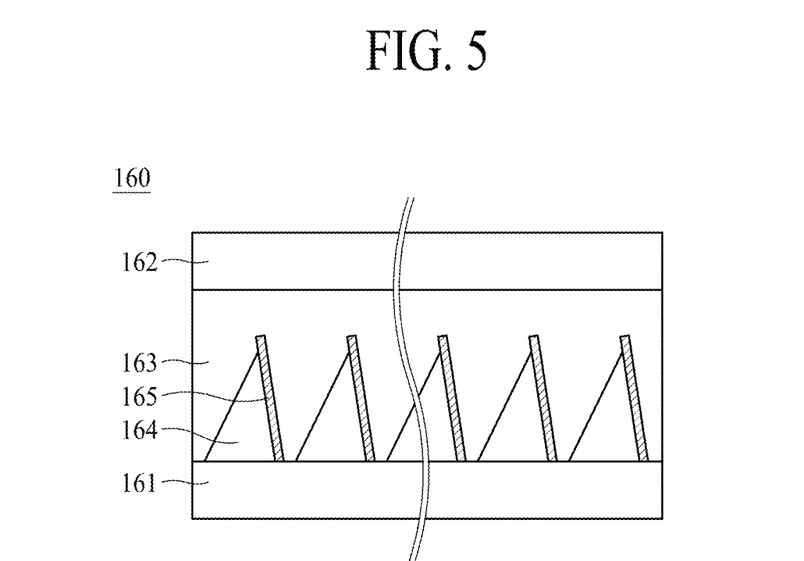
FIG. 5 is a cross-sectional view illustrating an optical film according to the first embodiment of the present disclosure.
Figure 6:
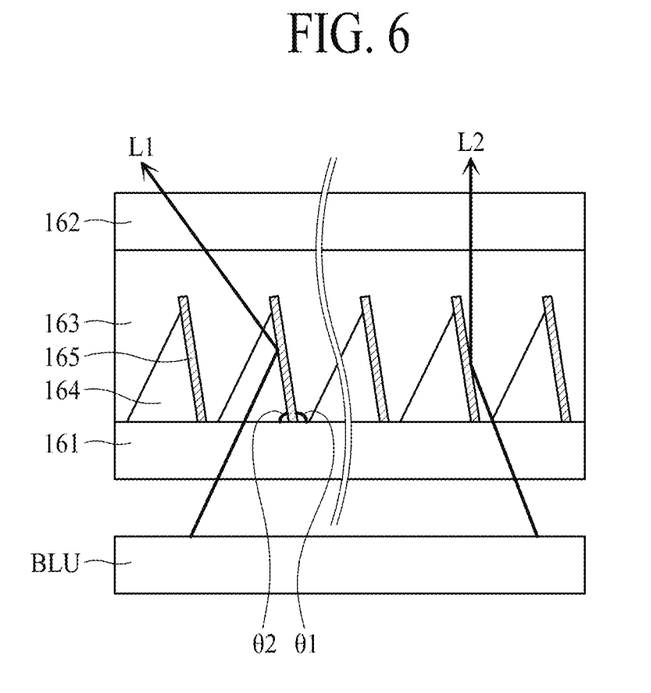
FIG. 6 is a cross-sectional view illustrating an optical path of an optical film according to the first embodiment of the present disclosure.

FIG. 5 is a cross-sectional view illustrating an optical film according to the first embodiment of the present disclosure, and FIG. 6 is a cross-sectional view illustrating an optical path of an optical film according to the first embodiment of the present disclosure.

Referring to FIGS. 5 and 6, the optical film according to the first embodiment of the present disclosure includes a first base film 161, a second base film 162, a light transmitting layer 163, an optical pattern 164, and a reflective member 165.

The first base film 161 and the second base film 162 are arranged to be spaced apart from and face each other. The light transmitting layer 163, the optical pattern 164 and the reflective member 165 are arranged between the first base film 161 and the second base film 162. The first base film 161 and the second base film 162 protect the light transmitting layer 163 and the optical pattern 164 and prevent the light transmitting layer 163 and the optical pattern 164 from being distorted. The first base film 161 and the second base film 162 may be made of a transparent material such as polycarbonate, for example.

The light transmitting layer 163 is arranged between the first base film 161 and the second base film 162. The light transmitting layer 163 may be arranged to surround the optical pattern 164 to maintain the optical pattern 164 at a certain angle. The light transmitting layer 163 transmits light entering the optical film 160. The light transmitting layer 163 may include a polymer having high light transmittance. For example, a thermoplastic resin, a thermosetting resin, and a UV hardening resin may be used as the light transmitting layer 163. Examples of the resin may include, but not limited to, a cellulose resin (for example, cellulose acetate butylate, cellulose triacetate, etc.), a polyolefin resin (for example, polyethylene, polypropylene, etc.), a polyester resin (for example, polyethylene terephthalate, etc.), polystyrene, polyurethane, polyvinylchloride, acrylic resin, and a polycarbonate resin.

The optical pattern 164 is arranged between the first base film 161 and the second base film 162, and more specifically, is arranged on the first base film 161, and is arranged between the light transmitting layers 163. The optical pattern according to one embodiment of the present disclosure has an inclined surface inclined at a certain angle, and for example may have a prism shape. As the optical pattern according to one embodiment of the present disclosure has a prism shape of one side is inclined at a certain angle, the optical pattern 164 supports the reflective member 165, which will be described later, to maintain a certain angle when the reflective member 165 is arranged at one side of the optical pattern 164.

The optical pattern 164 according to one example may include a polymer having high light transmittance. For example, a thermoplastic resin, a thermosetting resin, and a UV hardening resin may be used as the optical pattern 164. Examples of the resin may include, but not limited to, a cellulose resin (for example, cellulose acetate butylate, cellulose triacetate, etc.), a polyolefin resin (for example, polyethylene, polypropylene, etc.), a polyester resin (for example, polyethylene terephthalate, etc.), polystyrene, polyurethane, polyvinylchloride, acrylic resin, and a polycarbonate resin.

At this time, the optical pattern 164 according to one embodiment of the present disclosure may have the same refractive index as that of the light transmitting layer 163. Therefore, the optical pattern 164 may not change an optical path in addition to the reflective member 165, which will be described, even though light entering the optical film 160 from the light sources enters the light transmitting layer 163 through the optical pattern 164. The reflective index of the optical pattern 164 and the light transmitting layer 163 according to one example may be between 1.2 and 1.8.

Also, an angle of the optical pattern 164 with respect to the first base film 161 may be set in accordance with a purpose of the optical film 160. The optical pattern 164 according to one embodiment of the present disclosure has a first angle $\theta 1$ formed by one side on which the reflective member 165 is arranged and the first base film 161. Also, the optical pattern 164 has a second angle $\theta 2$ formed by an opposite side of one side on which the reflective member 165 is arranged and the first base film 161. At this time, one side of the optical pattern 164 according to one embodiment of the present disclosure is arranged such that the first angle $\theta 1$ is greater than the second angle $\theta 2$. That is, the optical film 160 according to one embodiment of the present disclosure is supported by the optical pattern 164 such that the reflective member 165 has the first angle $\theta 1$. As the first angle $\theta 1$ of the reflective member 165 with the first base film 161 is greater than the second angle $\theta 2$, when light from light sources enters the side which the reflective member 165 constitutes the first angle $\theta 1$, the light is reflected to a front side (direction orthogonal to the first base film 161) of the optical film 160 without being emitted to the other side (for example, right direction) of the optical film 160. At this time, the first angle $\theta 1$ of one side of the optical pattern 164 with respect to the first base film 161 may be 15° or less. If the optical film 160 is applied to the display device, the reflective member 165 may prevent an image of the display device from being irradiated to an unwanted place by controlling an emission angle and direction of the light.

The reflective member 165 is arranged at one side of the optical pattern 164. The reflective member 165 is supported by one side of the optical pattern 164. Therefore, the reflective member 165 according to one embodiment of the present disclosure may have the same first angle $\theta 1$ formed by the optical pattern 164 and the first base film 161. The reflective member 165 reflects incident light from the light sources.

Since the optical film of the related art absorbs every incident light at a certain angle, a problem occurs in that luminance of the display device is deteriorated because the incident light from the light sources is partially absorbed in the display device. However, in the optical film 160 according to the first embodiment of the present disclosure, the optical pattern 164 does not absorb light, and the reflective member 165 is arranged at one side of the optical pattern 164 to control an emission angle of the light, whereby luminance may be prevented from being deteriorated.

In more detail, referring to FIG. 6, first light L1 entering the optical film 160 from the backlight unit BLU is reflected toward one side of the reflective member 165 through the optical pattern 164. At this time, the first light L1 is reflected toward one side (for example, left direction) of the optical film 160 by the reflective member 165 having the first angle $\theta 1$ of 15° or less. That is, in the optical film 160 according to the first embodiment of the present disclosure, light headed for the other direction (for example, right direction) from the light sources is reflected and emitted to one direction without being emitted to the other direction by the reflective member 165. Therefore, in the optical film 160 according to the first embodiment of the present disclosure, since the reflective member 165 controls the emission angle or direction of the light, whereby an image of the display device may be prevented from being irradiated to an unwanted place.

Also, second light L2 entering the optical film 160 from the backlight unit BLU is reflected toward the other side of the reflective member 165 through the light transmitting layer 163 or the optical pattern 164. At this time, the second light L2 is reflected toward a front side (direction orthogonal to the first base film 161) of the optical film 160 by the reflective member 165 of which other side has the second angle $\theta 2$ of 165° or more with respect to the first base film 161. That is, in the optical film 160 according to the first embodiment of the present disclosure, light headed for one direction (for example, left direction) from the light sources is reflected and emitted to a front direction without being emitted to one direction by the reflective member 165.

As described above, in the optical film 160 according to the first embodiment of the present disclosure, the light headed for the other direction (for example, right direction) from the light sources is emitted to one direction (for example, left direction) by the reflective member 165, and the light headed for one direction from the light sources is emitted to a front direction (direction orthogonal to the first base film 161). That is, in the optical film 160 according to the first embodiment of the present disclosure, light is not emitted to the other direction regardless of an incident direction of the light. If the optical film 160 is applied to the display device such as the liquid crystal display device or the organic light emitting display device, the angle of the optical pattern 164 and the reflective member 165 with respect to the first base film 161 may be controlled to constitute an obtuse angle in a direction to which an image is not desired to be irradiated, whereby an image of the display device may be prevented from being irradiated to an unwanted place. For example, if the display device is built in a driver's seat of a car to display an image, the image of the display device is not irradiated upwardly, whereby the image may be prevented from being reflected toward a window of the car.

Figure 7:
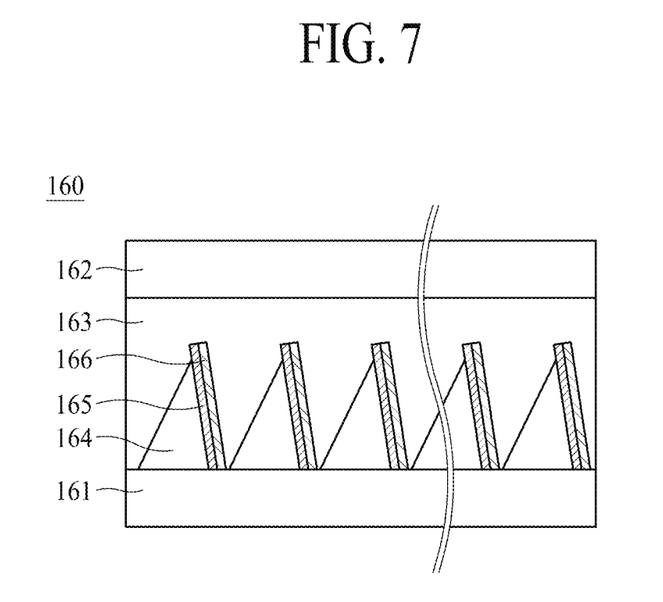
FIG. 7 is a cross-sectional view illustrating an optical film according to the second embodiment of the present disclosure.

FIG. 7 is a cross-sectional view illustrating an optical film according to the second embodiment of the present disclosure.

The optical film 160 according to the second embodiment of the present disclosure shown in FIG. 7 is the same as the optical film 160 according to the first embodiment described with reference to FIGS. 5 and 6 except that an absorption member 166 is additionally provided. Therefore, in the following description, only the absorption member 166 will be described, and repeated description of the same elements will be omitted.

Referring to FIG. 7, the optical film 160 according to the second embodiment of the present disclosure includes the absorption member 166 at one side of the reflective member 165. The absorption member 166 is supported at one side of the optical pattern 164 and the reflective member 165. Therefore, the absorption member 166 according to one embodiment of the present disclosure may have the same first angle θ1 formed by the optical pattern 165 and the first base film 161. The absorption member 166 absorbs light incident from the light sources.

The absorption member 166 according to one example is formed of a material that absorbs or shields light. Examples of the material, which absorbs or shields light, may include, but not limited to, a dark pigment such as black pigment or gray pigment, a dark dye such as black dye or gray dye, metal such as Al or Ag, a metal oxide, and a polymer of the dark pigment or the dark dye.

In the optical film 160 according to the first embodiment of the present disclosure, the reflective member 165 is only arranged at one side of the optical pattern 164 without the absorption member 166. If the reflective member 165 is only arranged in the optical pattern 164 like the optical film 160 according to the first embodiment of the present disclosure, light may be emitted to the outside of the optical film 160 without loss, whereby luminance of the display device may be enhanced. However, in the optical film 160 according to the first embodiment of the present disclosure, a ghost image may occur in a place where image information gets out of a normal image. Therefore, the optical film 160 according to the second embodiment of the present disclosure includes the absorption member 166 at one side of the reflective member 165, whereby the ghost image may be prevented from occurring and luminance may be more improved than that of the optical film according to the related art.

In more detail, in the optical film 160 according to the second embodiment of the present disclosure, the light headed for the other direction (for example, right direction) from the light sources through the optical pattern 164 is reflected toward one direction (for example, left direction) by the reflective member 165.

Also, in the optical film 160 according to the second embodiment of the present disclosure, the light headed for one direction (for example, left direction) from the light sources through the optical pattern 164 and the light transmitting layer 163 is absorbed by the absorption member 166 and is not emitted to the outside.

As described above, in the optical film 160 according to the second embodiment of the present disclosure, the light headed for one direction (for example, left direction) from the light sources is absorbed by the absorption member 166, and the light headed for the other direction (for example, right direction) from the light sources is emitted to one side or a front side (direction orthogonal to the first base film 161). That is, in the optical film 160 according to the second embodiment of the present disclosure, light is not emitted to the other direction regardless of an incident direction of the light. Since the light incident from one side is only reflected, a ghost image may be prevented from occurring.

If this optical film 160 is applied to the display device such as the liquid crystal display device or the organic light emitting display device, the angle of the optical pattern 164, the reflective member 165 and the absorption member 166 with respect to the first base film 161 may be controlled to constitute an obtuse angle in a direction to which an image is not desired to be irradiated, whereby an image of the display device may be prevented from being irradiated to an unwanted place. For example, if the display device is built in a driver's seat of a car to display an image, the image of the display device is not irradiated upwardly, whereby the image may be prevented from being reflected toward a window of the car.

Figure 8:
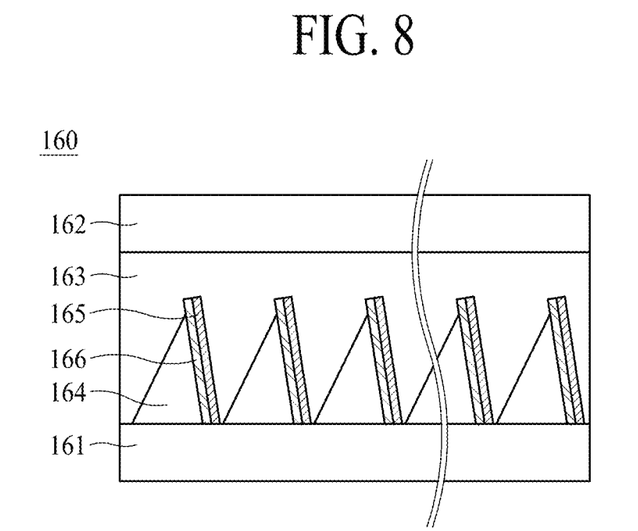
FIG. 8 is a cross-sectional view illustrating an optical film according to the third embodiment of the present disclosure.

FIG. 8 is a cross-sectional view illustrating an optical film according to the third embodiment of the present disclosure.

The optical film 160 according to the third embodiment of the present disclosure shown in FIG. 8 is the same as the optical film 160 according to the second embodiment described with reference to FIG. 7 except that a position of an absorption member 166 is changed. Therefore, in the following description, only the absorption member 166 will be described, and repeated description of the same elements will be omitted.

Referring to FIG. 8, the optical film 160 according to the third embodiment of the present disclosure includes the absorption member 166 between the optical pattern 164 and the reflective member 165. The absorption member 166 is supported at one side of the optical pattern 164. Therefore, the absorption member 166 according to one embodiment of the present disclosure may have the same first angle θ1 formed by the optical pattern 165 and the first base film 161. The absorption member 166 absorbs light incident from the light sources.

The absorption member 166 according to one example is formed of a material that absorbs or shields light. Examples of the material, which absorbs or shields light, may include, but not limited to, a dark pigment such as black pigment or gray pigment, a dark dye such as black dye or gray dye, metal such as Al or Ag, a metal oxide, and a polymer of the dark pigment or the dark dye.

In the optical film 160 according to the first embodiment of the present disclosure, the reflective member 165 is only arranged at one side of the optical pattern 164 without the absorption member 166. If the reflective member 165 is only arranged in the optical pattern 164 like the optical film 160 according to the first embodiment of the present disclosure, light may be emitted to the outside of the optical film 160 without loss, whereby luminance of the display device may be enhanced. However, in the optical film 160 according to the first embodiment of the present disclosure, a ghost image may occur in a place where image information gets out of a normal image. Therefore, the optical film 160 according to the third embodiment of the present disclosure includes the absorption member 166 at one side of the optical pattern 164, whereby the ghost image may be prevented from occurring and luminance may be more improved than that of the optical film according to the related art.

In more detail, in the optical film 160 according to the third embodiment of the present disclosure, the light headed for the other direction (for example, right direction) from the light sources through the optical pattern 164 is absorbed by the absorption member 166 and is not emitted to the outside.

Also, in the optical film 160 according to the third embodiment of the present disclosure, the light headed for one direction (for example, left direction) from the light sources through the optical pattern 164 and the light transmitting layer 163 is reflected toward a front side (direction orthogonal to the first base film 161) of the optical film 160 by the reflective member 165.

As described above, in the optical film 160 according to the third embodiment of the present disclosure, the light headed for the other direction (for example, right direction) from the light sources is absorbed by the absorption member 166, and the light headed for one direction (for example, left direction) from the light sources is emitted to a front side (direction orthogonal to the first base film 161). That is, in the optical film 160 according to the third embodiment of the present disclosure, light is not emitted to the other direction regardless of an incident direction of the light. Since the light incident from one side is only reflected, a ghost image may be prevented from occurring.

If this optical film 160 is applied to the display device such as the liquid crystal display device or the organic light emitting display device, the angle of the optical pattern 164, the reflective member 165 and the absorption member 166 with respect to the first base film 161 may be controlled to constitute an obtuse angle in a direction to which an image is not desired to be irradiated, whereby an image of the display device may be prevented from being irradiated to an unwanted place. For example, if the display device is built in a driver's seat of a car to display an image, the image of the display device is not irradiated upwardly, whereby the image may be prevented from being reflected toward a window of the car.

Figure 9:
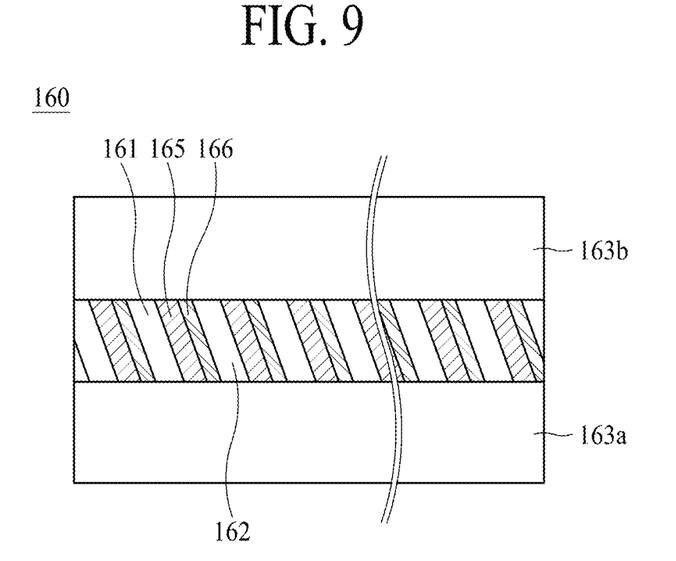
FIG. 9 is a cross-sectional view illustrating an optical film according to the fourth embodiment of the present disclosure.

FIG. 9 is a cross-sectional view illustrating an optical film according to the fourth embodiment of the present disclosure.

The optical film 160 according to the fourth embodiment of the present disclosure shown in FIG. 9 is the same as the optical film 160 according to the second embodiment described with reference to FIG. 7 except that the optical pattern 164 is removed and positions of the light transmitting layer 163 and the first and second base films 161 and 162 are changed. Therefore, in the following description, only the light transmitting layer 163 and the first and second base films 161 and 162 will be described, and repeated description of the same elements will be omitted.

Referring to FIG. 9, the optical film 160 according to the fourth embodiment of the present disclosure includes a first light transmitting layer 163*a*, a second light transmitting layer 163*b* spaced apart from the first light transmitting layer 163*a* to face the first light transmitting layer 163*a*, and first and second base films 161 and 162 arranged between the first light transmitting layer 163*a* and the second light transmitting layer 163*b* and spaced apart from each other to face each other. At this time, the optical film 160 according to the fourth embodiment of the present disclosure includes a reflective member 165 and an absorption member 166 between the first base film 161 and the second base film 162.

The optical film 160 according to the fourth embodiment of the present disclosure have the same effect as that of the optical film 160 according to the second embodiment described with reference to FIG. 7 except that the positions of the light transmitting layer 163 and the first and second base films 161 and 162 are changed.

However, in the optical film 160 according to the fourth embodiment of the present disclosure, after the reflective member 165 and the absorption member 166 are deposited on the first base film 161 and then the second base film 162 is deposited, the reflective member 165 and the absorption member 166 are cut to be inclined at a certain angle. Therefore, in the optical film 160 according to the fourth embodiment of the present disclosure, since the reflective member 165 and the absorption member 166 are formed to be inclined at a certain angle without the optical pattern 164, the manufacturing method may be simplified.

Figure 10:
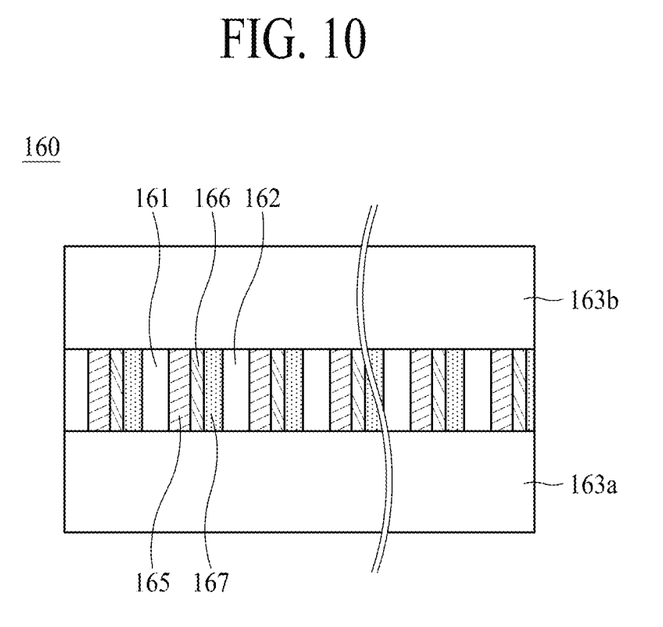
FIG. 10 is a cross-sectional view illustrating an optical film according to the fifth embodiment of the present disclosure.

FIG. 10 is a cross-sectional view illustrating an optical film according to the fifth embodiment of the present disclosure.

The optical film 160 according to the fifth embodiment of the present disclosure shown in FIG. 10 is the same as the optical film 160 according to the fourth embodiment described with reference to FIG. 9 except that an adhesive member 167 is additionally provided. Therefore, in the following description, only the adhesive member 167 will be described, and repeated description of the same elements will be omitted.

Referring to FIG. 10, the optical film 160 according to the fifth embodiment of the present disclosure includes the adhesive member 167 between the first base film 161 and the second base film 162. The adhesive member 167 adheres the base films 161 and 162 to the reflective member 165 or the absorption member 166.

In the optical film 160 according to the fifth embodiment of the present disclosure, since the base films 161 and 162 are adhered to the reflective member 165 or the absorption member 166 by the adhesive member 167, a space is not generated between the base films 161 and 162 and the reflective member 165 or the absorption member 166 to minimize a refractive index, whereby a ghost image may be prevented from occurring.

Also, in the optical film 160 according to the fifth embodiment of the present disclosure, since the absorption member 166 is arranged between the adhesive members 167, the absorption member 166 may be formed very thinly. Therefore, in the optical film 160 according to the fifth embodiment of the present disclosure, an aperture ratio of the optical film 160 may be increased by reducing a width of the absorption member 166. In the display device to which the optical film 160 according to the fifth embodiment of the present disclosure is applied, luminance may be enhanced.

Meanwhile, although FIG. 10 illustrates that the adhesive member 167 is arranged between the absorption member 166 and the first or second base film 161 or 162, the adhesive member 167 may be arranged at a side of the reflective member 165 or both sides of the absorption member 166 without limitation to the example of FIG. 10.

Figure 11:
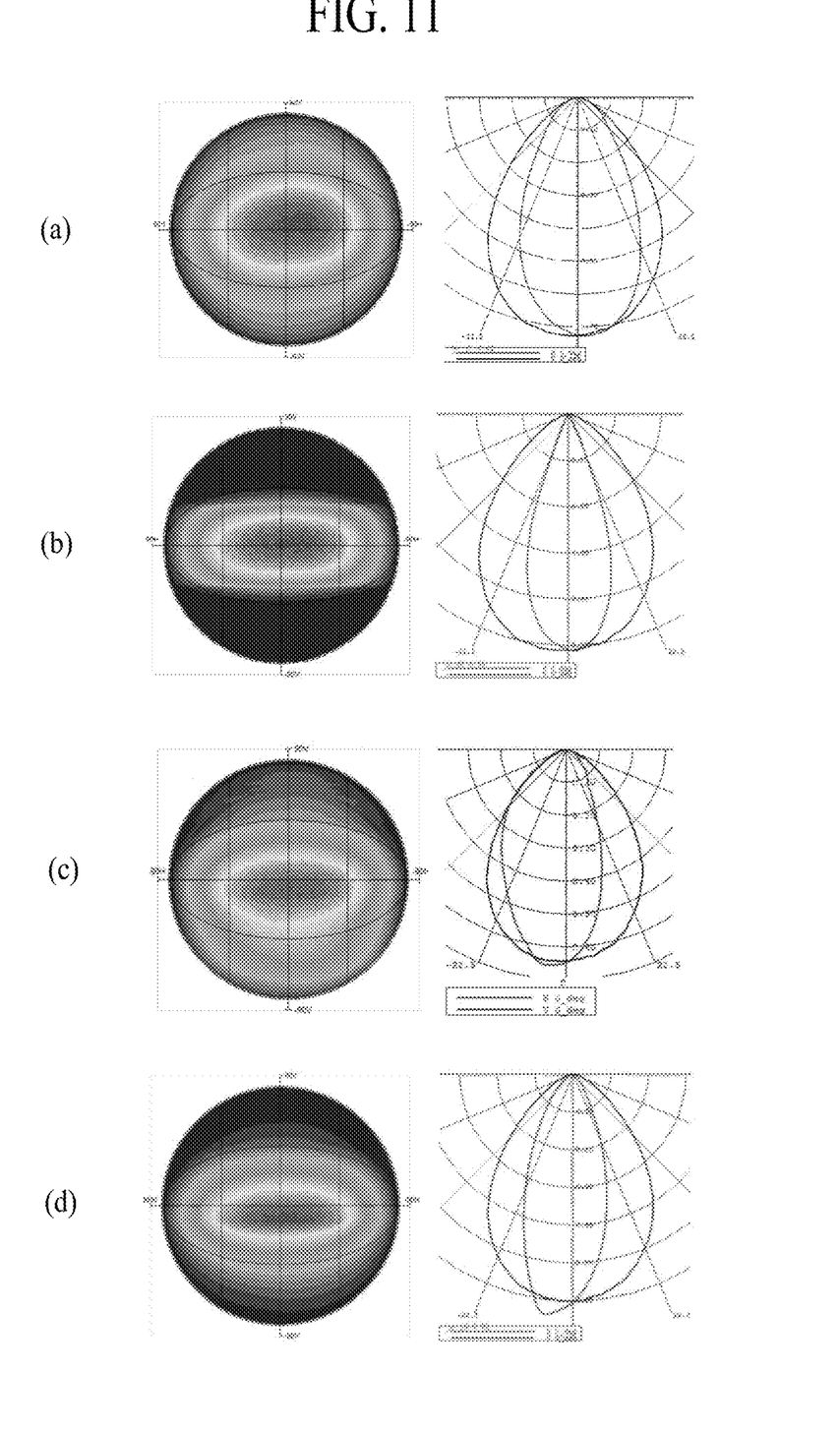
FIG. 11 is a view illustrating an optical profile of a backlight unit according to elements of an optical film.

FIG. 11 is a view illustrating an optical profile of a backlight unit in accordance with elements of an optical film.

Portion (a) of FIG. 11 illustrates an optical profile of a backlight unit BLU to which the optical film 160 is not applied, and portion (b) of FIG. 11 illustrates an optical profile of a backlight unit BLU to which the optical film of the related art having no reflective member 165 is applied. When luminance of the backlight unit BLU to which the optical film 160 is not applied is 100%, luminance of the backlight unit BLU to which the optical film of the related art having no reflective member 165 is 75.4% and deteriorated as much as 24.6%.

Portion (c) of FIG. 11 illustrates an optical profile of a backlight unit BLU to which the optical film 160 according to the first embodiment of the present disclosure is applied. Although luminance of the backlight unit BLU to which the optical film 160 according to the first embodiment of the present disclosure is applied is 90% which is very high, image quality may be deteriorated by a ghost image.

Portion (d) of FIG. 11 illustrates an optical profile of a backlight unit BLU to which the optical film 160 according to the second embodiment of the present disclosure is applied. Luminance of the backlight unit BLU to which the optical film 160 according to the second embodiment of the present disclosure is applied is 83.3% which is relatively higher than that of the backlight unit BLU to which the optical film of the related art is applied, and a ghost image is not generated, whereby image quality is not deteriorated.

As described above, according to the present disclosure, the following advantages may be obtained.

The optical film according to one embodiment of the present disclosure includes the optical pattern having an inclined surface inclined at a certain angle and the reflective member arranged at one side of the optical pattern, and the reflective member may control the emission angle of the light, whereby the image of the display image may be prevented from being irradiated to the unwanted place.

In the optical film according to one embodiment of the present disclosure, since the reflective member is arranged, the light is reflected by the reflective member without being absorbed, whereby luminance may be prevented from being deteriorated.

In addition to the effects of the present disclosure as mentioned above, additional advantages and features of the present disclosure will be clearly understood by those skilled in the art from the above description of the present disclosure.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. An optical film, comprising:
   a first base film;
   a second base film spaced apart from the first base film to face the first base film;
   a plurality of optical patterns between the first base film and the second base film, and having an inclined surface inclined at a certain angle;
   a reflective member and an absorption member at only a same one side of each of the plurality of optical patterns; and
   a light transmitting layer between the first base film and the second base film, the light transmitting layer covering the plurality of optical patterns,
   wherein the light transmitting layer is a same material as that of the plurality of optical patterns,
   wherein the first base film and the second base film are spaced apart by a same distance, and
   wherein the second base film and each optical pattern are spaced apart from each other.

2. The optical film according to claim 1, wherein each of the plurality of optical patterns has a prism shape.

3. The optical film of claim 1, wherein each of the plurality of optical patterns has:
   a first angle formed by one side on which the reflective member is arranged and the first base film; and
   a second angle formed by an opposite side of the one side and the first base film, the first angle being greater than the second angle.

4. The optical film of claim 1, wherein the light transmitting layer has the same refractive index as that of the plurality of optical patterns.

5. The optical film of claim 1, wherein the absorption member is disposed between the one side of the plurality of optical patterns and the reflective member.

6. The optical film of claim 5, wherein:
   the light transmitting layer covers the reflective member and other side of opposite to the one side of the optical pattern; and
   the light transmitting layer directly contacts the first base film between the reflective member and the other side of the plurality of optical patterns.

7. A display device, comprising:
   a printed circuit board;
   light sources packaged in the printed circuit board;
   an optical sheet portion arranged on the light sources;
   the optical film according to claim 1 arranged on the optical sheet portion; and
   a liquid crystal panel arranged on the optical film.

8. The display device according to claim 7, wherein each of the plurality of optical patterns has a prism shape.

9. The display device according to claim 7, wherein each of the plurality of optical patterns has:
   a first angle formed by one side on which the reflective member is arranged and the first base film; and
   a second angle formed by an opposite side of the one side and the first base film, the first angle being greater than the second angle.

10. The display device according to claim 7, wherein:
    the plurality of optical patterns is arranged on the first base film; and
    the plurality of optical patterns further includes a light transmitting layer between the first base film and the second base film.

11. The display device according to claim 7, further comprising an absorption member between the plurality of optical patterns and the reflective member.

12. The optical film of claim 1, wherein the reflective member and the absorption member are both inclined at the certain angle.

13. The optical film according to claim 1, wherein the reflective member reflects light incident through the first base film toward the second base film.

14. The optical film according to claim 1, further comprising:
a plurality of gap spaces between the plurality of optical patterns,
wherein the light transmitting layer directly contacts the first base film in each of the plurality of gap spaces between the plurality of optical patterns.

15. An optical film, comprising:
a first light transmitting layer;
a second light transmitting layer spaced apart from the first light transmitting layer to face the first light transmitting layer;
a plurality of base films between the first light transmitting layer and the second light transmitting layer, the plurality of base films being spaced apart from each other to face each other;
a reflective member and an absorption member between the plurality of base films, any one of the reflective member and the absorption member being coated on one side of the each of the plurality of base films; and
an adhesive member between the other of the reflective member and the absorption member and the other side of the each of the plurality of base films.

16. The optical film according to claim 15, wherein:
the plurality of base films comprises:
a first base film; and
a second film; and
the first and second base films, the reflective member, and the absorption member each are disposed parallel to each other between a first light transmitting layer and the second light transmitting layer.

17. The optical film according to claim 15, wherein:
the plurality of base films comprises a first base film and a second film;
the reflective member is disposed between the first base film and the second base film; and
the absorbing member is disposed between the reflective member and the second base film.

18. A display device, comprising:
a printed circuit board;
light sources packaged in the printed circuit board;
an optical sheet portion arranged on the light sources;
the optical film according to claim 15 arranged on the optical sheet portion; and
a liquid crystal panel arranged on the optical film.

19. The display device according to claim 15, wherein:
the plurality of reflective members is coated on one side of the each of the plurality of base films;
the plurality of absorption members is coated on one side of each of the plurality of reflective members; and
the adhesive member is in contact with each of the plurality of the absorption members and the other side of the each of the plurality of base films.

* * * * *